(12) United States Patent
Yoshimoto et al.

(10) Patent No.: US 10,583,937 B2
(45) Date of Patent: Mar. 10, 2020

(54) PASSENGER BOARDING BRIDGE

(71) Applicant: SHINMAYWA INDUSTRIES, LTD., Takarazuka-shi, Hyogo (JP)

(72) Inventors: Takahiro Yoshimoto, Takarazuka (JP); Shoichi Kawabata, Takarazuka (JP); Makoto Masui, Takarazuka (JP)

(73) Assignee: SHINMAYWA INDUSTRIES, LTD., Takarazuka-Shi, Hyogo (JP)

( * ) Notice: Subject to any disclaimer, the term of this patent is extended or adjusted under 35 U.S.C. 154(b) by 0 days.

(21) Appl. No.: 16/328,827

(22) PCT Filed: Nov. 24, 2016

(86) PCT No.: PCT/JP2016/084812
§ 371 (c)(1),
(2) Date: Feb. 27, 2019

(87) PCT Pub. No.: WO2018/096618
PCT Pub. Date: May 31, 2018

(65) Prior Publication Data
US 2019/0241283 A1    Aug. 8, 2019

(51) Int. Cl.
*B64F 1/305* (2006.01)
(52) U.S. Cl.
CPC .................... *B64F 1/305* (2013.01)
(58) Field of Classification Search
CPC .................. B64F 1/305; E01D 15/12
USPC .................................. 14/69.5–71.5
See application file for complete search history.

(56) References Cited

U.S. PATENT DOCUMENTS

| | | | | |
|---|---|---|---|---|
| 6,659,704 B2 * | 12/2003 | Fukuhara | .............. | B64F 1/3055 14/71.5 |
| 8,302,237 B2 * | 11/2012 | Shimizu | ................ | B64F 1/3055 14/69.5 |
| 9,090,359 B2 * | 7/2015 | Wada | ....................... | E01D 15/10 |
| 2009/0223005 A1 * | 9/2009 | Motohashi | ................ | B64F 1/31 14/72.5 |
| 2015/0082558 A1 | 3/2015 | Wada | | |

FOREIGN PATENT DOCUMENTS

JP        5073109 B1      8/2012
JP      2013173537 A     9/2013

* cited by examiner

*Primary Examiner* — Raymond W Addie
(74) *Attorney, Agent, or Firm* — Alleman Hall Creasman & Tuttle LLP

(57) ABSTRACT

A passenger boarding bridge comprises a first walkway of an inner tunnel of adjacent tunnels of an extendable and retractable tunnel section; and a second walkway of an outer tunnel of the adjacent tunnels, the second walkway including a plurality of floor members which are arranged in the front-rear direction and are coupled to each other. The plurality of floor members are supported by an endless string-shaped member that is rotatable. A respective walkway surface of each walkway is at a predetermined equal height position. When the tunnel section is retracted, the string-shaped member of the second walkway is guided so that the floor members are moved down to an underside of the inner tunnel, and when the tunnel section is extended, the string-shaped member of the second walkway is guided so that the floor members are moved up from the underside of the inner tunnel.

8 Claims, 12 Drawing Sheets

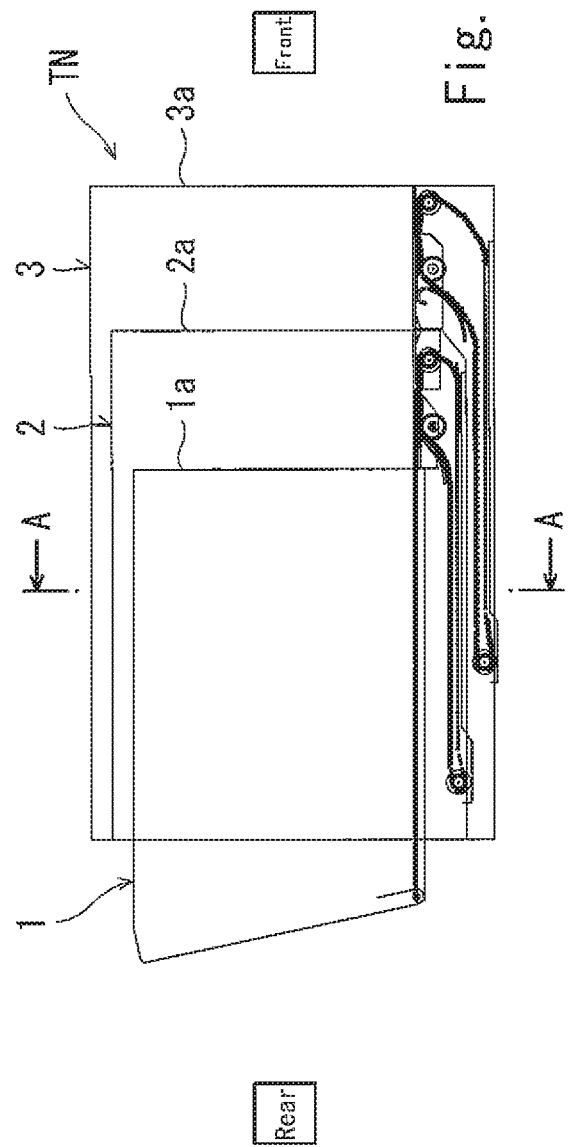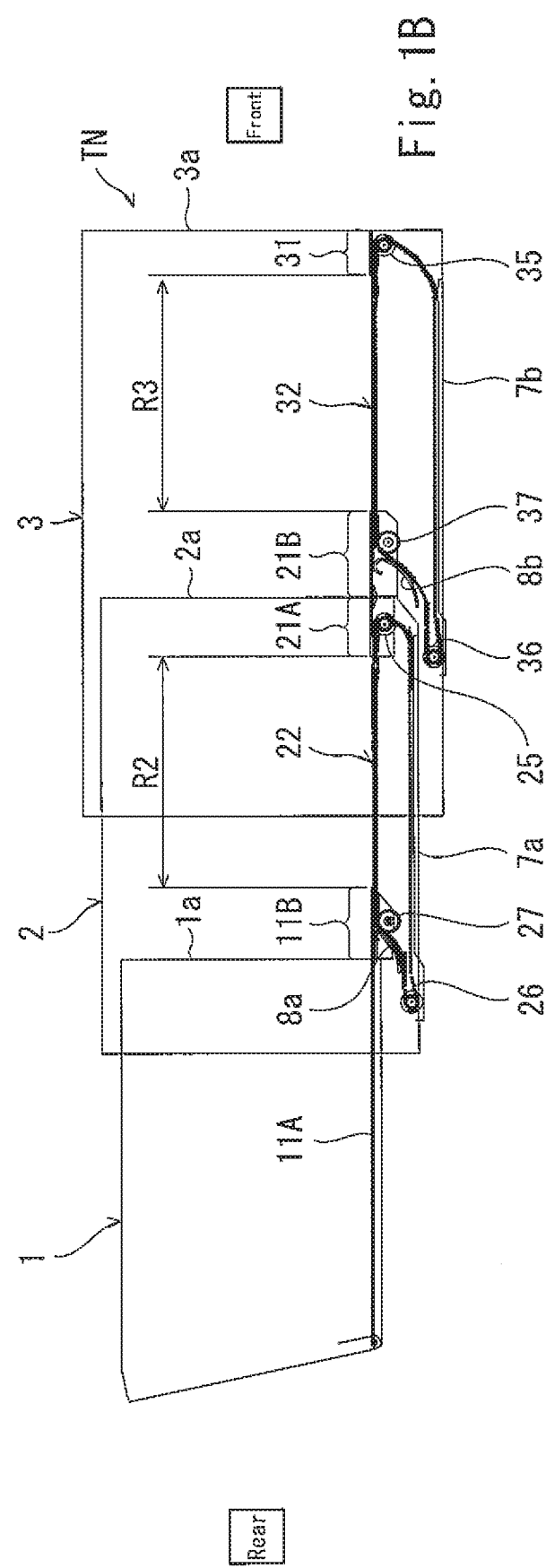

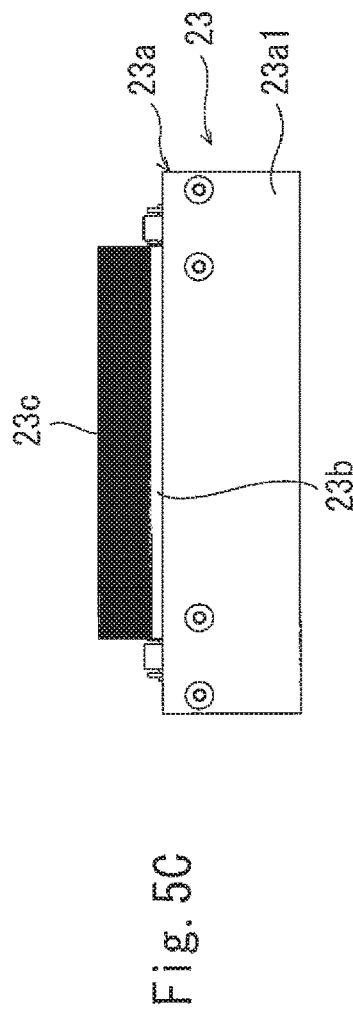
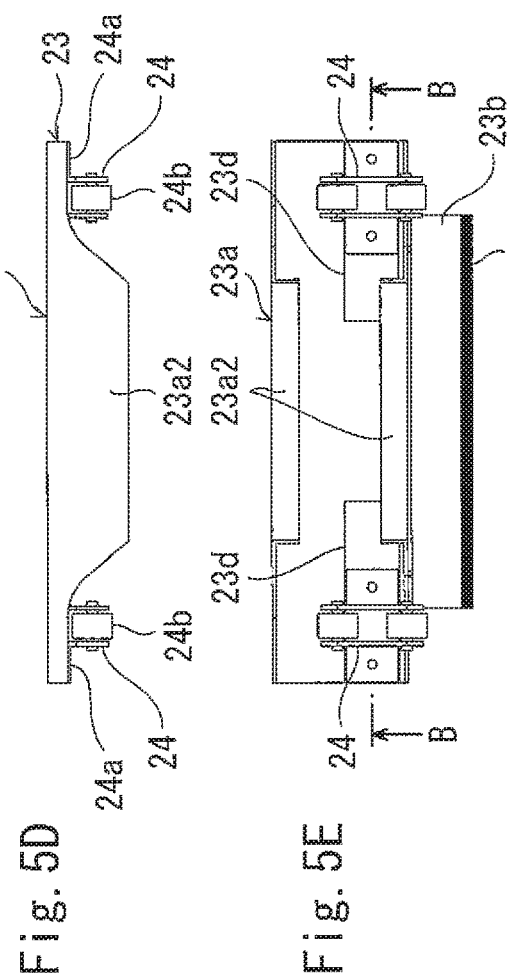
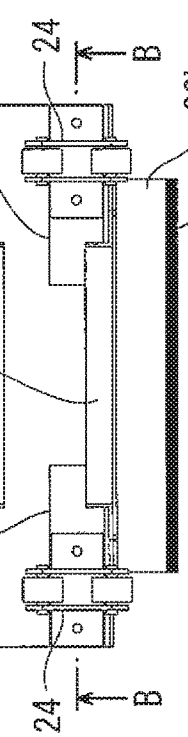
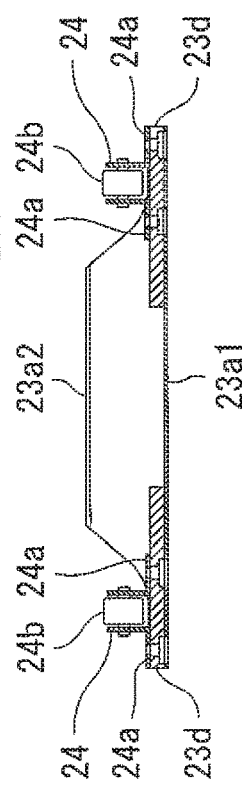
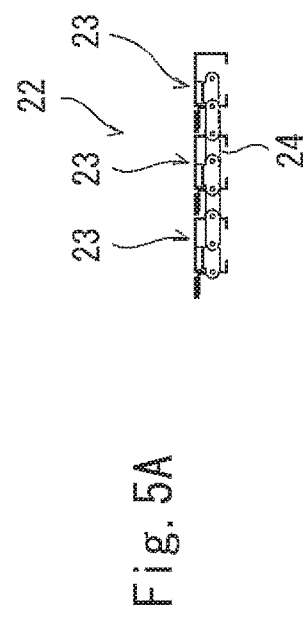
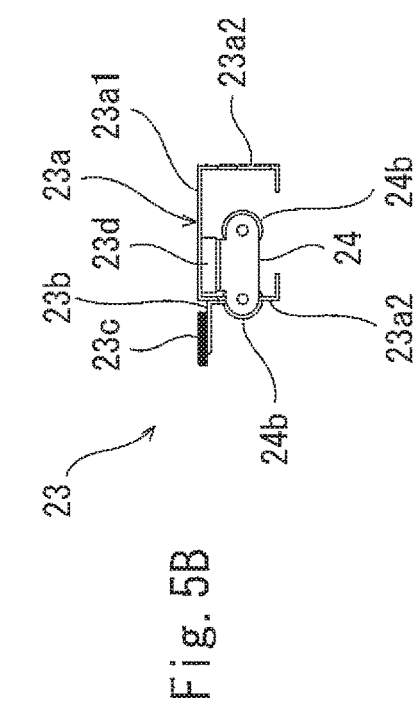

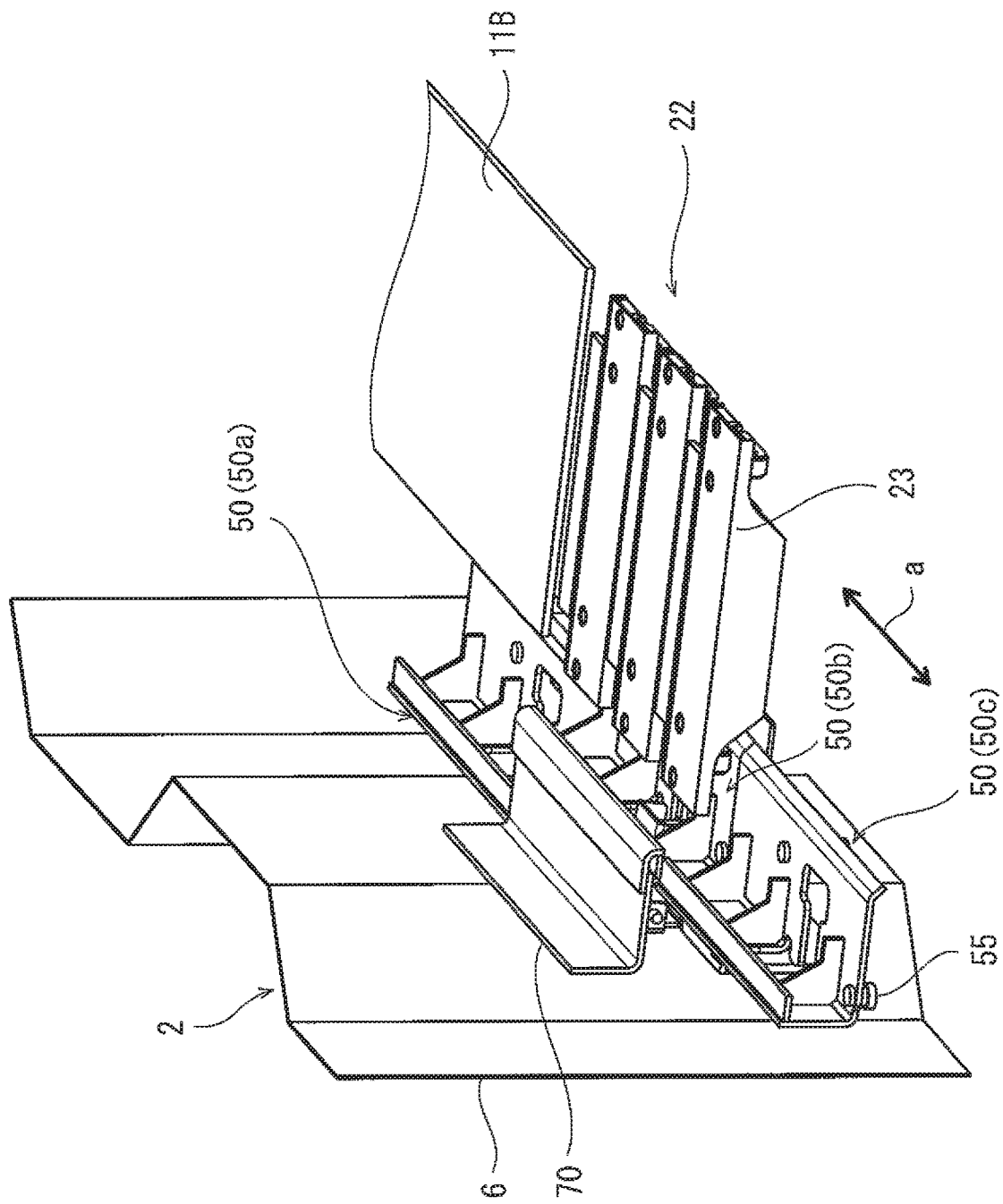

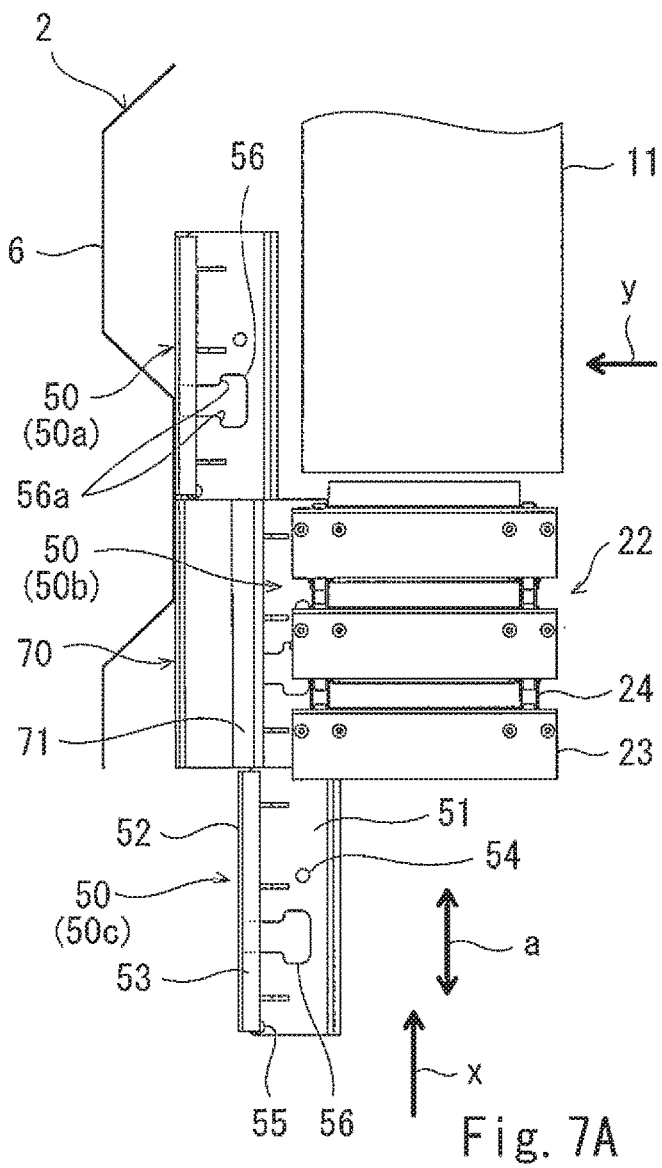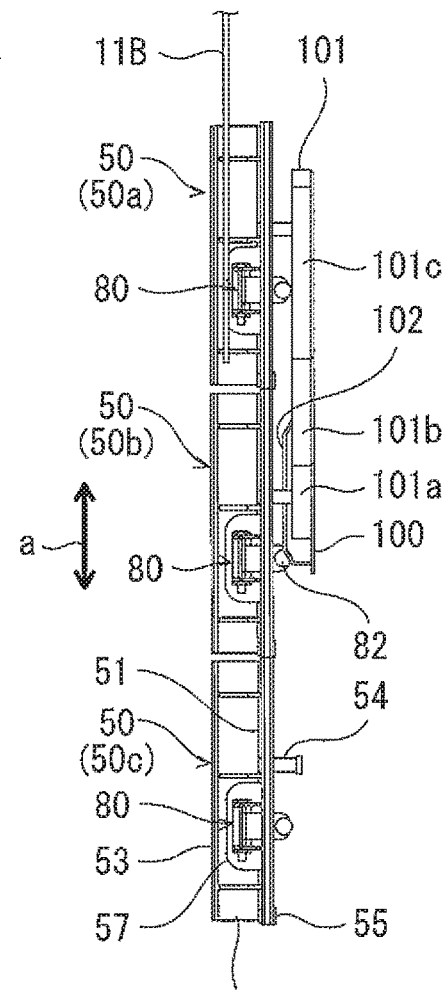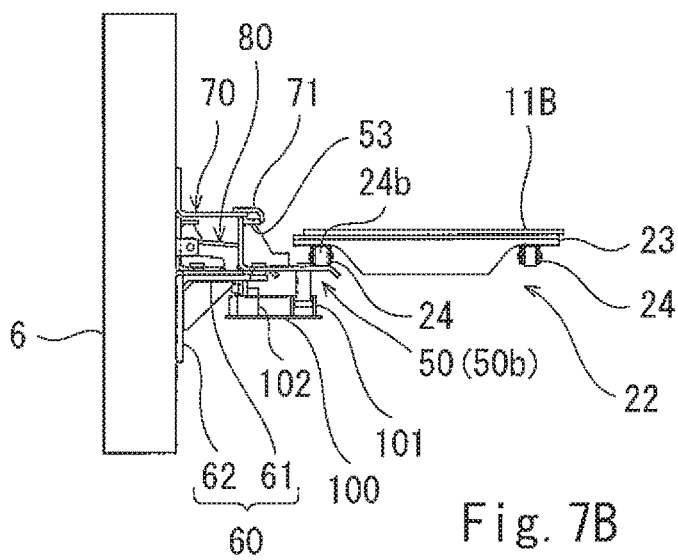
Fig. 7A
Fig. 7C
Fig. 7B

PASSENGER BOARDING BRIDGE

TECHNICAL FIELD

The present invention relates to a passenger boarding bridge.

BACKGROUND ART

In a case where passengers get into and off an aircraft (airplane) in an aircraft, a passenger boarding bridge coupling a terminal building to the aircraft is sometimes used.

The passenger boarding bridge includes a rotunda connected to a platform of the terminal building, a tunnel section having a base end connected to the rotunda and being extendable and retractable, and a cab (head) provided at the tip end of the tunnel section and connected to the aircraft.

The tunnel section includes a plurality of tunnels which are telescopically fitted to each other. The tunnel section is extendable and retractable over the entire length in a front-rear direction (lengthwise or longitudinal direction). With this configuration, a change in a distance between the terminal building and the aircraft can be properly dealt with. In this case, floors of the tunnels form a walkway for the passengers between the platform of the terminal building and an entrance of the aircraft in the airport.

Adjacent tunnels with an outer-inner-tunnel relation are telescopically fitted to each other. In this structure, a stepped portion is formed in the walkway constituted by these tunnels. This impedes smooth walk of the passengers (travelers). Under the circumstances, a stepless structure of the walkway for eliminating the stepped portion has been proposed.

For example, Patent Literature 1 and Patent Literature 2 disclose a configuration in which the outer tunnel of the adjacent tunnels includes a movable walkway comprised of a plurality of floor members, and the movable walkway of the outer tunnel is moved to the underside of the floor of the inner tunnel. In the example disclosed in Patent Literature 1, the first end (one end) portion of the movable walkway is secured to a fixed walkway provided at the tip end portion of the outer tunnel. In the example disclosed in Patent Literature 2, the first end (one end) portion of the movable walkway is secured to a fixed walkway of a cab (head) provided at the tip end of the outer tunnel.

CITATION LIST

Patent Literature

Patent Literature 1: Japanese Patent Publication No. 5073109
Patent Literature 2: Japanese-Laid Open Patent Application Publication No. 2013-173537

SUMMARY OF INVENTION

Technical Problem

Regarding the configurations disclosed in Patent Literature 1 and Patent Literature 2, easier maintenance is not sufficiently studied. For example, it is not easy to carry out maintenance for the floor members or the like of the movable walkway lying under the floor of the inner tunnel.

The present invention has been developed to solve the above-described problem, and an object of the present invention is to provide a passenger boarding bridge which allows maintenance to be easily carried out.

Solution to Problem

To achieve the above-described object, according to the present invention, there is provided a passenger boarding bridge including a tunnel section including a plurality of tunnels which are telescopically fitted to each other and are movable relative to each other in a front-rear direction so that the tunnel section is extendable and retractable, the passenger boarding bridge comprising: a first walkway section constituting a walkway of an inner tunnel of adjacent tunnels; and a second walkway section constituting a walkway of an outer tunnel of the adjacent tunnels, the walkway of the outer tunnel including a plurality of floor members which are arranged in the front-rear direction and are coupled to each other, wherein the second walkway section includes an endless string-shaped member supported so that the endless string-shaped member is rotatable along a virtual vertical plane parallel to the front-rear direction, and the plurality of floor members are supported by the endless string-shaped member, wherein a walkway surface of the first walkway section of the inner tunnel and a walkway surface of the second walkway section of the outer tunnel are at a predetermined equal height position, wherein in a case where the tunnel section is retracted, the endless string-shaped member of the second walkway section is guided so that the floor members are moved down to an underside of the inner tunnel, and wherein in a case where the tunnel section is extended, the endless string-shaped member of the second walkway section is guided so that the floor members are moved up from the underside of the inner tunnel.

In accordance with this configuration, the second walkway section is configured so that the plurality of floor members are supported by the endless string-shaped member supported so as to be rotatable. In a case where maintenance for the second walkway section is carried out, the second walkway section can be rotated so that the floor members lying at the underside of the walkway surface of the second walkway section are exposed as the walkway surface. Therefore, the maintenance for the floor members, such as replacement or repair of the floor members can be easily carried out.

The passenger boarding bridge may comprise, to support the endless string-shaped member so that the endless string-shaped member is rotatable: a first guide member mounted at a front location of the outer tunnel and being engageable with the endless string-shaped member; a second guide member mounted at a rear location of the outer tunnel and below the inner tunnel, the second guide member being engageable with the endless string-shaped member; and a third guide member mounted on a front end of the inner tunnel and protruding into the outer tunnel, the third guide member being engageable with the endless string-shaped member which is located on an upper side and is between the first guide member and the second guide member, wherein the walkway section of the outer tunnel is constituted by the floor members supported by the endless string-shaped member which is located on the upper side and is between the first guide member and the third guide member, and wherein in a case where the tunnel section is extended and retracted, the endless string-shaped member may be guided by the third guide member so that a length in the front-rear direction of the walkway surface of the second walkway section is increased and reduced.

The endless string-shaped member may include a pair of string-shaped members disposed to be spaced apart in a width direction of the second walkway section, the first guide member includes a pair of guide members disposed to be spaced apart in the width direction of the second walkway section, the second guide member includes a pair of guide members disposed to be spaced apart in the width direction of the second walkway section, and the third guide member includes a pair of guide members disposed to be spaced apart in the width direction of the second walkway section.

The outer tunnel may include: a plurality of support sections provided at the outer tunnel along the front-rear direction and configured to support from the underside, the endless string-shaped member which is located on the upper side and is between the first guide member and the third guide member so that the walkway surface of the second walkway section is maintained at the predetermined height position, the plurality of support sections being movable in the width direction of the second walkway section, and in a case where the tunnel section is retracted and the floor members of the second walkway section are moved down to the underside of the inner tunnel, the support sections may be moved outward in the width direction of the second walkway section away from the endless string-shaped member and ceases to support the endless string-shaped member, and in a case where the tunnel section is extended and the second walkway section is moved up from the underside of the inner tunnel, the floor members of the second walkway section may be moved inward in the width direction of the second walkway section and supports the endless string-shaped member.

The plurality of floor members may be supported over an entire periphery of the endless string-shaped member, and the passenger boarding bridge may comprise: a driving unit which drives the endless string-shaped member so that the endless string-shaped member is rotated in forward and reverse directions.

In accordance with this configuration, for example, the second walkway section is rotatable according to the walking direction in each of a case where passengers get into an aircraft and a case where the passengers get off the aircraft. This makes it possible to reduce a walking distance of the passengers. In addition, this is convenient in the maintenance for the second walkway section.

The endless string-shaped member may be constituted by a chain, and each of the first, second, and third guide members may be constituted by a sprocket.

The endless string-shaped member may be constituted by a belt member or a wire, and each of the first, second, and third guide members may be constituted by a pulley.

Advantageous Effects of Invention

The present invention has the above-described configuration, and can obtain an advantage in that a passenger boarding bridge which allows maintenance to be easily carried out can be provided.

The above and further objects, features and advantages of the present invention will more fully be apparent from the following detailed description with accompanying drawings.

BRIEF DESCRIPTION OF DRAWINGS

FIGS. 1(A) and 1(B) are views showing an example of a tunnel section of a passenger boarding bridge according to an embodiment.

FIGS. 5(A) to 5(F) are views showing floor members and chains constituting the movable walkway section.

FIG. 6 is a perspective view showing an extracted portion of the movable walkway section of the second tunnel which is in the vicinity of a fixed walkway section protruding to the front from the first tunnel, and a region which is in the vicinity of the movable walkway section.

FIG. 7(A) is a plan view of the portion of FIG. 6. FIG. 7(B) is a view showing the portion of FIG. 7(A), when viewed in a walkway length direction. FIG. 7(C) is a view showing the portion of 7(A), when viewed in a walkway width direction.

DESCRIPTION OF EMBODIMENTS

Figure 2:
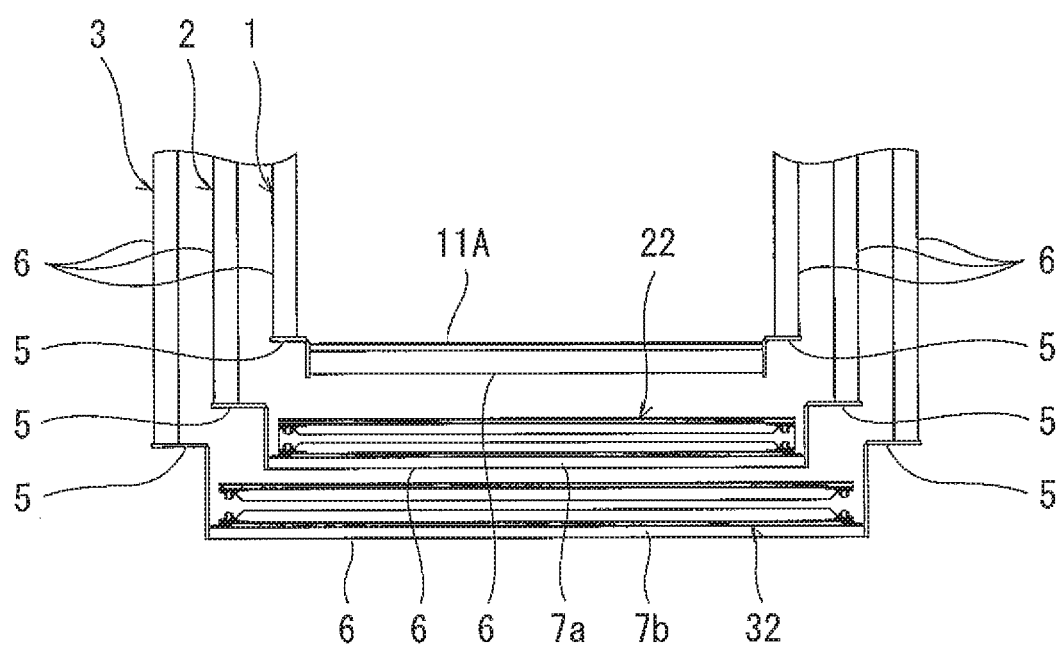
FIG. 2 is a cross-sectional view taken along line A-A of FIG. 1(A).

Hereinafter, the preferred embodiment of the present invention will be described with reference to the drawings. In the description below, throughout the drawings, the same or corresponding constituents (components or elements) are designated by the same reference symbols and repeated description thereof is omitted. In the drawings, the constituents are omitted in some cases for easier illustration. The present invention is not limited to the embodiment described below.

Embodiment

FIGS. 1(A) and 1(B) are views showing an example of a tunnel section of a passenger boarding bridge according to the embodiment. FIG. 1(A) is a schematic perspective view showing a state in which the tunnel section is most retracted, when viewed from a side. FIG. 1(B) is a schematic perspective view showing a state in which the tunnel section is most extended (extended to its maximum length), when viewed from a side. FIG. 2 is a cross-sectional view taken along line A-A of FIG. 1(A).

Hereinafter, a direction in which a tunnel section TN of the passenger boarding bridge is extendable and retractable over an entire length will be referred to as "front-rear direction" and a direction in which a gravitational force works on the passenger boarding bridge will be referred to as "up-down direction (vertical direction)". Also, a walkway width direction or a width direction which will be described later corresponds to a direction perpendicular to the front-rear direction and the up-down direction. Further, as shown in FIG. 1, in the passenger boarding bridge, a side which is closer to an aircraft will be referred to as "front" and a side which is closer to a terminal building will be referred to as "rear".

The passenger boarding bridge according to the present embodiment includes the tunnel section TN comprised of a plurality of tunnels 1 to 3 with a tubular shape which are telescopically fitted to each other and are movable relative to each other in the front-rear direction so that the tunnel section TN is extendable and retractable. The tunnel section TN constitutes a walkway on which passengers can walk. As defined herein, the front-rear direction of the tunnel section TN conforms to the lengthwise (longitudinal) direction of the tunnel section TN and the tunnels 1 to 3.

In addition to the tunnel section TN, the passenger boarding bridge includes a rotunda (rear circular room), a cab (front circular room), and a drive column, which are not shown in the drawings. The rotunda is connected to a platform of the terminal building. The rotunda is supported so that it is rotatable around an axis extending in the up-down direction (vertical direction). The rotunda is connected to the rear end portion of the tunnel section TN. The cab is connected to the front end of the tunnel section TN (front end of the tunnel 3 in the present example), and rotatably provided. The drive column is coupled to, for example, a suitable location which is a front location of the tunnel section TN (specifically, a suitable location of the foremost tunnel 3) to support the tunnel section N.

When a drive wheel at the lower end of the drive column travels in the front-rear direction on an apron, a driving force for extension/retraction movement in the front-rear direction is transferred to the tunnel section TN. When the tunnel section TN is extended to its maximum length, and the cab disposed at the front end of the tunnel section TN reaches the entrance of the aircraft, a walkway on which the passengers can walk is formed between the platform of the terminal building and the entrance of the aircraft in the airport. The drive column is extendable and retractable in the up-down direction (in the vertical direction). By the extension/retraction movement in the up-down direction, of the drive column, the tunnel section TN can perform a pivot (swing) movement in the up-down direction, with respect to the rotunda which is located in the vicinity of the platform of the terminal building. An operation board (not shown) is disposed inside the cab. By manipulating this operation board, an operator can operate devices (e.g., drive column or the like) of the passenger boarding bridge.

Next, the tunnel section TN which is the feature of the present embodiment will be described in detail. Hereinafter, the tunnels 1, 2, and 3 will be referred to as a first tunnel 1, a second tunnel 2, and a third tunnel 3, respectively.

Each of the first to third tunnels 1 to 3 has a substantially quadrangular prism shape and a hollow space. Beams 5 (FIG. 2) made of steel are provided at the sides of each of quadrangular prisms. To couple the beams 5, for example, iron-made panels 6 (FIG. 2) are mounted on side surfaces and upper and lower surfaces of the quadrangular prisms. In this way, tubular members 1a, 2a, 3a (FIG. 1) are constructed.

The first tunnel 1 includes fixed walkway sections 11A, 11B comprised of floor members secured to the members (beams 5, or the like) of the first tunnel 1 so that the passengers can walk on the fixed walkway sections 11A, 11B.

The second tunnel 2 includes fixed walkway sections 21A, 21B and a movable walkway section 22 on which the passengers can walk. The fixed walkway sections 21A, 21B are constituted by floor members secured to the members of the second tunnel 2, at the front portion of the second tunnel 2. For example, as shown in FIG. 5(A), the movable walkway section 22 is constructed so that a plurality of floor members 23 are coupled to each other by a pair of endless chains (string-shaped members) 24 disposed to be spaced apart from each other in the walkway width direction (width direction of the movable walkway section 22). First to third sprockets (guide members) 25 to 27 are provided to correspond to each of the chains 24. Each of the chains 24 is engaged with the corresponding first to third sprockets 25 to 27. Thus, each of the chains 24 is rotatable along a virtual vertical plane parallel to the front-rear direction. The first sprockets 25 and the second sprockets 26 are mounted on the second tunnel 2. The third sprockets 27 are mounted on the first tunnel 1.

Figure 3A:
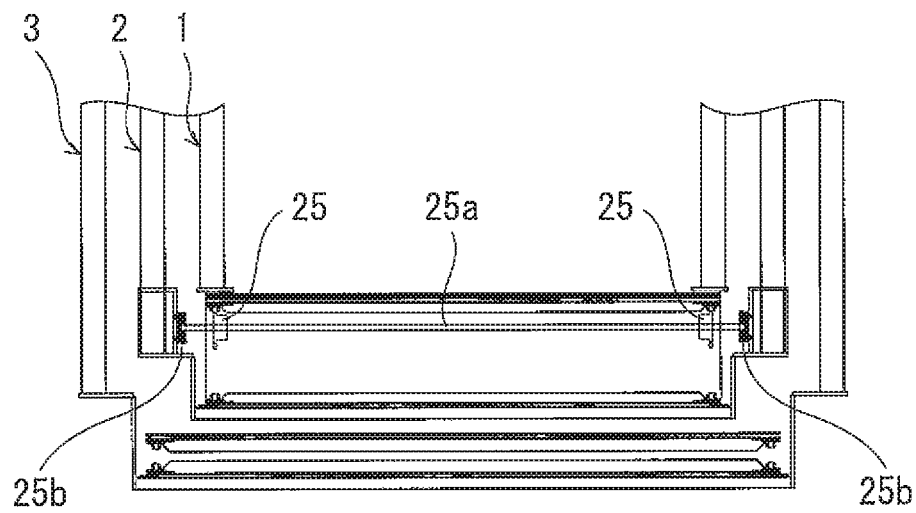
FIGS. 3(A), 3(B), and 3(C) are schematic cross-sectional views of a tunnel section, showing examples of layout of first, second, and third sprockets of a movable walkway section of a second tunnel.
Figure 3B:
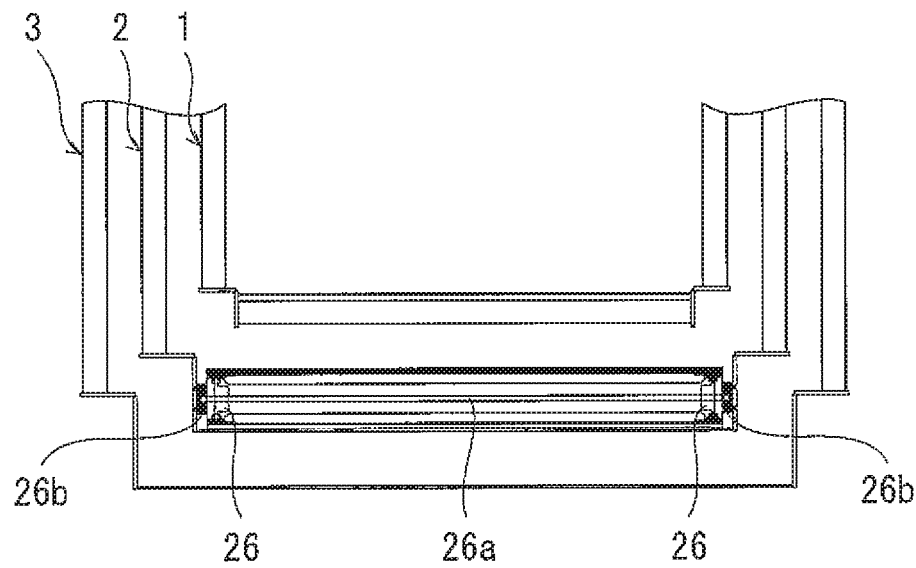
Figure 3C:
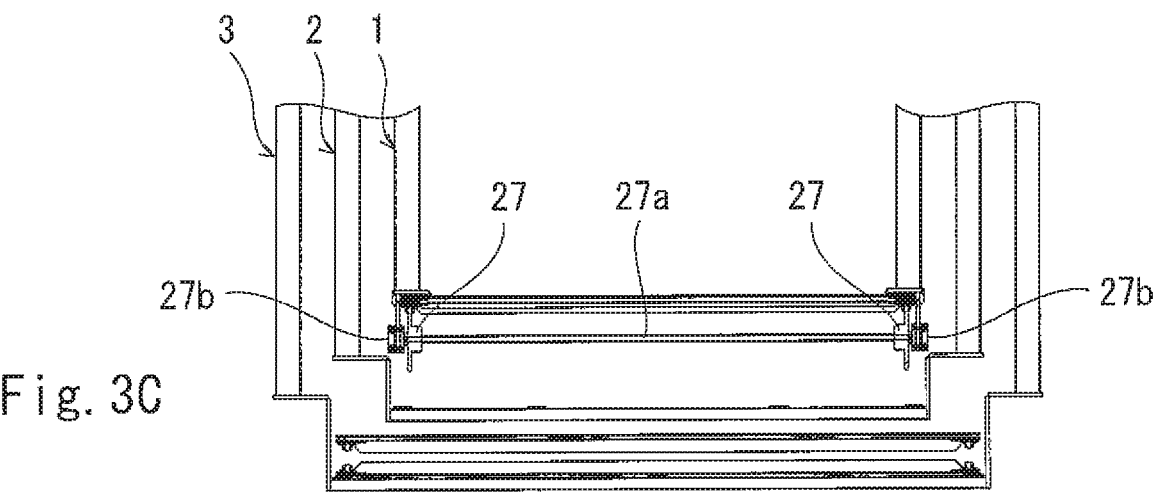

FIGS. 3(A), 3(B), and 3(C) are schematic cross-sectional views of the tunnel section, showing the example of layout of the first sprockets 25, the example of layout of the second sprockets 26, and the example of layout of the third sprockets 27.

The first sprockets 25 are rotatably mounted at front locations of the second tunnel 2. Specifically, as shown in FIG. 3(A), the pair of first sprockets 25 are secured to one coupling shaft 25a. The both ends of the coupling shaft 25a are supported by bearings 25b, respectively, so that the coupling shaft 25a is rotatable. The two bearings 25b are secured to the second tunnel 2.

The second sprockets 26 are rotatably mounted at rear locations of the second tunnel 2, and under (below) the first tunnel 1. Specifically, as shown in FIG. 3(B), the pair of second sprockets 26 are secured to one coupling shaft 26a. The both ends of the coupling shaft 26a are supported by bearings 26b, respectively, so that the coupling shaft 26a is rotatable. The two bearings 26b are secured to the second tunnel 2.

The third sprockets 27 are rotatably mounted at suitable locations of the front end of the first tunnel 1 and protrude into the second tunnel 2. Specifically, as shown in FIG. 3(C), the pair of third sprockets 27 are secured to one coupling shaft 27a. The both ends of the coupling shaft 27a are supported by bearings 27b, respectively, so that the coupling shaft 27a is rotatable. The two bearings 27b are secured to a member protruding to the front from the tubular member 1a of the first tunnel 1.

The third tunnel 3 includes a fixed walkway section 31 and a movable walkway section 32 on which the passengers can walk. The fixed walkway section 31 is constituted by floor members secured to the members of the third tunnel 3, at a front portion of the third tunnel 3. The constituents of the movable walkway section 32 have basically the same configuration as that of the constituents of the movable walkway section 22 described above, except a dimension or the like. The movable walkway section 32 is constructed so that the plurality of floor members 23 are coupled to each other by the pair of endless chains 24 disposed to be spaced apart from each other in the walkway width direction. First to third sprockets 35 to 37 are provided to correspond to each of the chains 24. Each of the chains 24 is engaged with the corresponding first to third sprockets 35 to 37. Thus, each of the chains 24 is rotatable along the virtual vertical plane parallel to the front-rear direction. The first sprockets 35 and the second sprockets 36 are mounted on the third tunnel 3. The third sprockets 37 are mounted on the second tunnel 2.

Figure 4A:
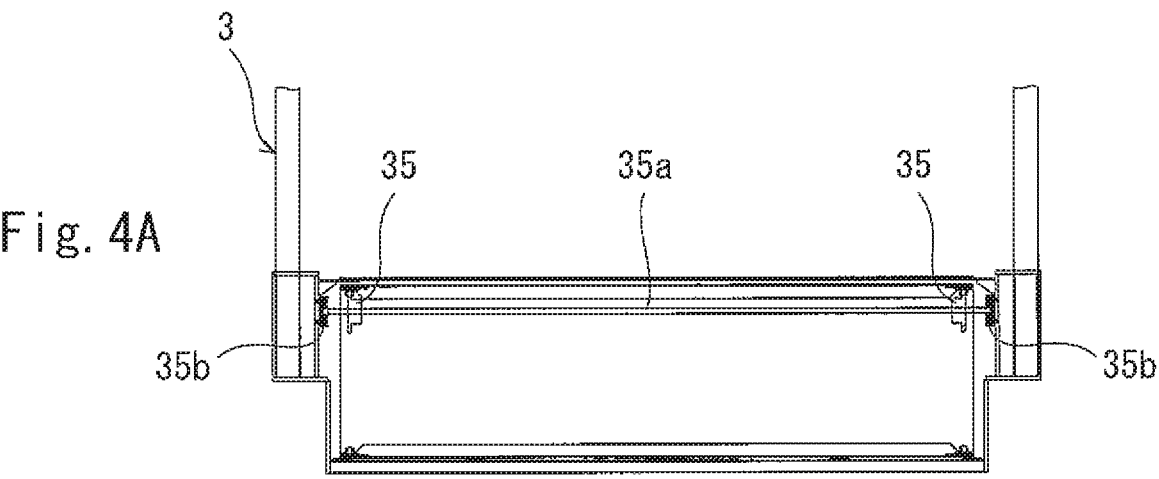
FIGS. 4(A), 4(B), and 4(C) are schematic cross-sectional views of the tunnel section, showing examples of layout of first, second, and third sprockets of a movable walkway section of a third tunnel.
Figure 4B:
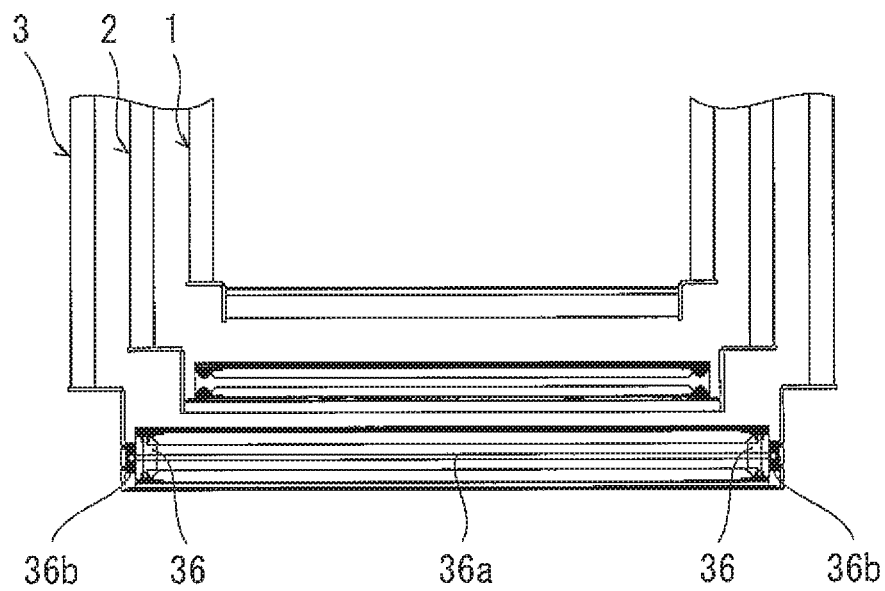
Figure 4C:
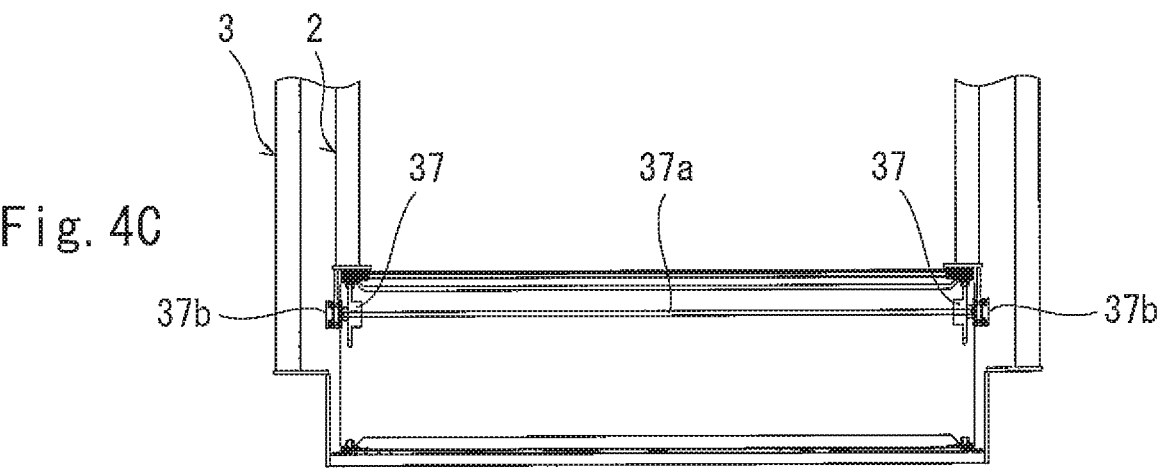

FIGS. 4(A), 4(B), and 4(C) are schematic cross-sectional views of the tunnel section, showing the example of layout of the first sprockets 35, the example of layout of the second sprockets 36, and the example of layout of the third sprockets 37.

The first sprockets 35 are rotatably mounted at front locations of the third tunnel 3. Specifically, as shown in FIG. 4(A), the pair of first sprockets 35 are secured to one coupling shaft 35a. The both ends of the coupling shaft 35a are supported by bearings 35b, respectively, so that the coupling shaft 35a is rotatable. The two bearings 35b are secured to the third tunnel 3.

The second sprockets 36 are rotatably mounted at rear locations of the third tunnel 3, and under (below) the second tunnel 2. Specifically, as shown in FIG. 4(B), the pair of second sprockets 36 are secured to one coupling shaft 36a. The both ends of the coupling shaft 36a are supported by bearings 36b, respectively, so that the coupling shaft 36a is rotatable. The two bearings 36b are secured to the third tunnel 3.

The third sprockets 37 are rotatably mounted at suitable locations of the front end of the second tunnel 2 and protrude into the third tunnel 3. Specifically, as shown in FIG. 4(C), the pair of third sprockets 37 are secured to one coupling shaft 37a. The both ends of the coupling shaft 37a are supported by bearings 37b, respectively, so that the coupling shaft 37a is rotatable. The two bearings 37b are secured to a member protruding to the front from the tubular member 2a of the second tunnel 2.

The first tunnel 1 includes the fixed walkway section 11A provided at the tubular member 1a, in the entire region from the rear end portion of the tubular member 1a to the front end portion of the tubular member 1a, and the fixed walkway section 11B protruding to the front from the front end of the tubular member 1a. The second tunnel 2 includes the fixed walkway section 21A provided at a front portion (portion which is near the front end portion) inside the tubular member 2a, and the fixed walkway section 21B protruding to the front from the front end of the tubular member 2a. The third tunnel 3 includes the fixed walkway section 31 at a front portion (portion which is near the front end portion) inside the tubular member 3a.

The fixed walkway sections 11A, 11B, 21A, 21B, 31 are provided so that the heights (vertical levels) of walkway surfaces (obverse surfaces) thereof are substantially equal to each other. The movable walkway sections 22, 32 are provided so that the heights of walkway surfaces thereof are substantially equal to those of the fixed walkway sections 11A, 11B, 21A, 21B, 31. In brief, the movable walkway sections 22, 32 and the fixed walkway sections 11A, 11B, 21A, 21B, 31 are provided so that the walkway surfaces thereof are at a predetermined equal height position (predetermined equal vertical level).

A dimension in the walkway width direction, of the fixed walkway section 11B protruding to the front from the first tunnel 1 is larger than that of the fixed walkway section 11A, and is substantially equal to that of the movable walkway section 22 of the second tunnel 2 and that of the fixed walkway section 21A of the second tunnel 2. Therefore, it may be said that the fixed walkway section 11B constitutes a portion of the walkway of the second tunnel 2, together with the movable walkway section 22 and the fixed walkway section 21A. Likewise, a dimension in the walkway width direction, of the fixed walkway section 21B protruding from the second tunnel 2, is larger than that of the fixed walkway section 21A, and is substantially equal to that of the movable walkway section 32 of the third tunnel 3 and that of the fixed walkway section 31 of the third tunnel 3. Therefore, it may be said that the fixed walkway section 21B constitutes a portion of the walkway of the third tunnel 3, together with the movable walkway section 32 and the fixed walkway section 31.

For example, iron-made plates 7a, 7b are disposed at the bottom portions of the tubular members 2a, 3a of the second and third tunnels 2, 3, respectively. The lower portions of the movable walkway sections 22, 32 are placed on the iron-made plates 7a, 7b, respectively. A guide plate 8a with a curved shape is mounted on the front end portion of the first tunnel 1 to guide the movable walkway section 22 of the second tunnel 2 to a region that is under the tubular member 1a of the first tunnel 1 while avoiding a contact between the movable walkway section 22 and the tubular member 1a. Likewise, a guide plate 8b with a curved shape is mounted on the front end portion of the second tunnel 2 to guide the movable walkway section 32 of the third tunnel 3 to a region that is under the tubular member 2a of the second tunnel 2 while avoiding a contact between the movable walkway section 32 and the tubular member 2a.

Next, the detail of the movable walkway sections 22, 32 will be described with reference to FIGS. 5 to 12.

FIGS. 5(A) to 5(F) are views showing the floor members 23 and the chains 24 constituting each of the movable walkway sections 22, 32. FIG. 5(A) is a side view showing a state in which the plurality of floor members 23 which are a portion of each of the movable walkway sections 22, 32 are coupled to each other by the chain 24. FIG. 5(B) is an enlarged view showing one of the floor members 23 shown in FIG. 5(A). FIG. 5(C) is a top plan view showing the floor member 23 from above. FIG. 5(D) is a side view of the floor member 23. FIG. 5(E) is a bottom view showing the floor member 23 from the underside. FIG. 5(F) is a cross-sectional view taken along line of B-B of FIG. 5(E). FIG. 5(B) to 5(F) show a portion of the chains 24 secured to one floor member 23.

Each of the floor members 23 includes a body 23a with a C-shape (FIG. 5(B)) in a side view, which is comprised of a flat plate 23a1 with a rectangular shape, and reinforcement portions 23a2 provided on both sides of the flat plate 23a1, a rubber mounting portion 23b with an L-shaped cross-section which is fastened to the body 23a, a rubber 23c secured to the rubber mounting portion 23b, and a reinforcement chain mounting portion 23d secured to the reverse surface of the flat plate 23a1. The rubber 23c is provided as a buffering member provided between adjacent floor members 23.

Each of the chains 24 is constituted by a roller chain including rollers 24b. Each of the chains 24 is provided with mounting portions 24a to mount the floor members 23. Each of the mounting portions 24a is joined to the chain mounting portion 23d and fastened to the floor member 23 by a bolt. The flat plate 23a1 of the floor member 23 and the chain mounting portion 23d are formed with bolt insertion holes. The mounting portion 24a of the chain 24 is formed with a female thread which is threadingly engageable with the bolt.

In each of the movable walkway sections 22, 32, the plurality of floor members 23 are mounted on the pair of endless chains 24 at predetermined pitch. In each of the movable walkway sections 22, 32, a continuous carpet (not shown) is provided over the outer surfaces (the surfaces of the flat plates 23a1 and the surfaces of the rubbers 23c) of the plurality of floor members 23. The height position (vertical level) of the walkway surfaces, including the thickness of this carpet, is set as the height position of the walkway surfaces of the fixed walkway sections 11A, 11B, 21A, 21B, 31. In the present embodiment, the floor members 23 and the carpet are provided over the entire periphery of the endless chains 24. However, this is exemplary. It is sufficient that the floor members 23 and the carpet are provided in a range which is more than a maximum range R2 in which the movable walkway section 22 can become the walkway surface and a range which is more than a maximum range R3 in which the movable walkway section 32 can become the walkway surface.

In an actual configuration, a ratio of the length of the long side to the short side of the rectangular shape of the flat plate 23a1 of each floor member 23 is more than that shown in the drawings. In other words, a dimension ratio of the flat plate 23a1 shown in FIGS. 5(C) to 5(F) is different from actual one. Also, for example, as shown in FIG. 2, the walkway width of the movable walkway section 32 of the third tunnel 3 is larger than that of the movable walkway section 22 of the second tunnel 2. More specifically, the length of the long side of the flat plate 23a1 of the floor member 23 of the movable walkway section 32 is larger than that of the flat plate 23a1 of the floor member 23 of the movable walkway section 22.

The two movable walkway sections 22, 32 have basically the same configuration. Also, the constituents for supporting the two movable walkway sections 22, 32 have basically the same configuration. Therefore, hereinafter, the detail of the constituents for supporting the movable walkway section 22 will be described, and description of the constituents for supporting the movable walkway section 32 will be omitted.

Figure 8:
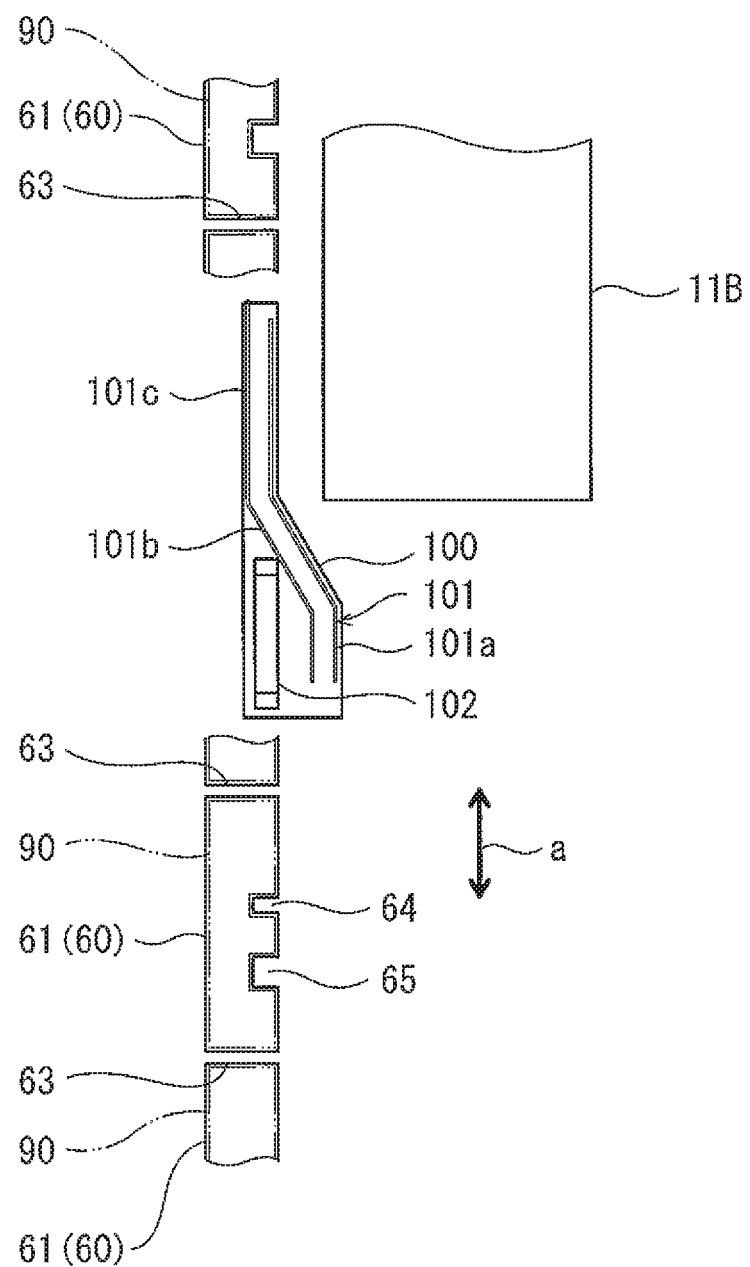
FIG. 8 is a plan view showing a guide groove, an unlocking part, or the like which are not shown in FIG. 6.
Figure 9A:
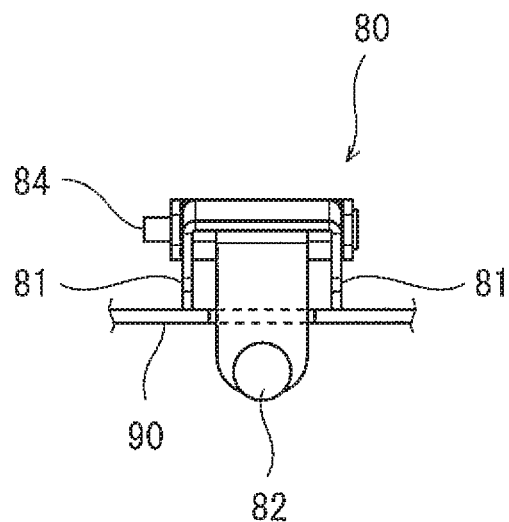
FIG. 9(A) is a front view of a locking mechanism.
Figure 9B:
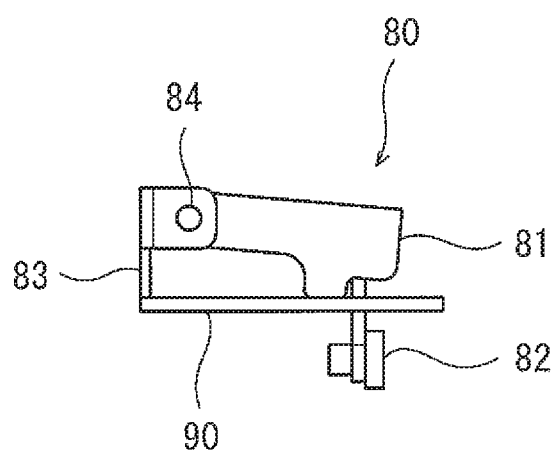
FIG. 9(B) is a side view of the locking mechanism.

FIG. 6 is a perspective view showing an extracted portion of the movable walkway section 22 of the second tunnel 2 which is in the vicinity of the fixed walkway section 11B protruding to the front from the first tunnel 1, and a region which is in the vicinity of the movable walkway section 22. Although the tunnel section has a laterally symmetric configuration with respect to the fixed walkway section 11B and the movable walkway section 22, FIG. 6 shows a portion of the structure on one side. FIG. 7(A) is a plan view of the portion of FIG. 6. FIG. 7(B) is a view showing the portion of FIG. 7(A), when viewed in the walkway length direction (arrow x direction). FIG. 7(C) is a view showing the portion of FIG. 7(A), when viewed in the walkway width direction (arrow y direction). FIG. 7(C) does not show the movable walkway section 22. FIG. 8 is a top plan view showing a guide groove 101, an unlocking part 102, or the like which are not shown in FIG. 6, in a region substantially corresponding to the portion of FIG. 6. FIG. 9(A) is a front view of a locking mechanism 80. FIG. 9(B) is a side view of the locking mechanism 80.

Figure 10A:
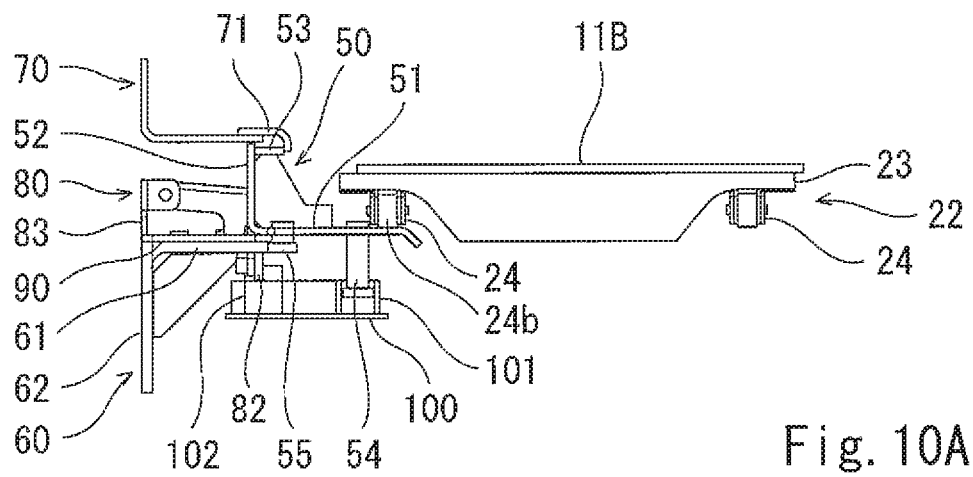
FIG. 10(A) is a view showing a first state of a support section which is near the fixed walkway section protruding to the front from the first tunnel, and a region which is in the vicinity of the support section, when viewed in the walkway length direction.
Figure 10B:
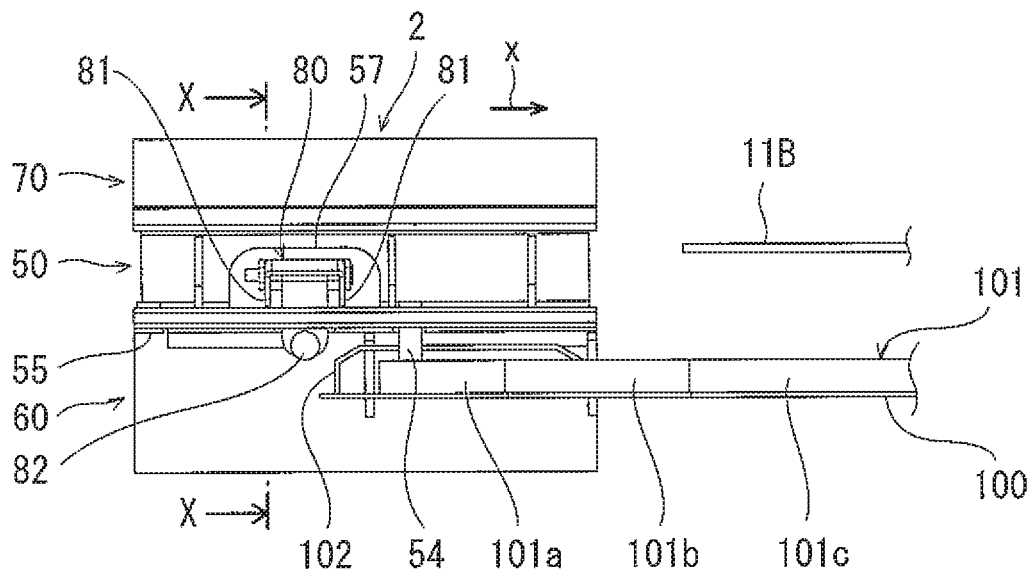
FIG. 10(B) is a view showing the same portion as that of FIG. 10(A), when viewed in the walkway width direction.
Figure 10C:
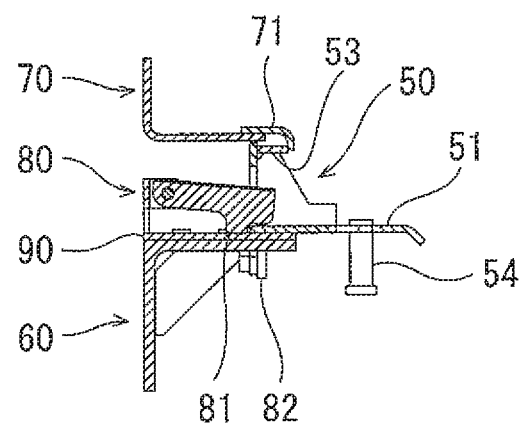
FIG. 10(C) is a cross-sectional view taken along line X-X of FIG. 10(B).
Figure 11A:
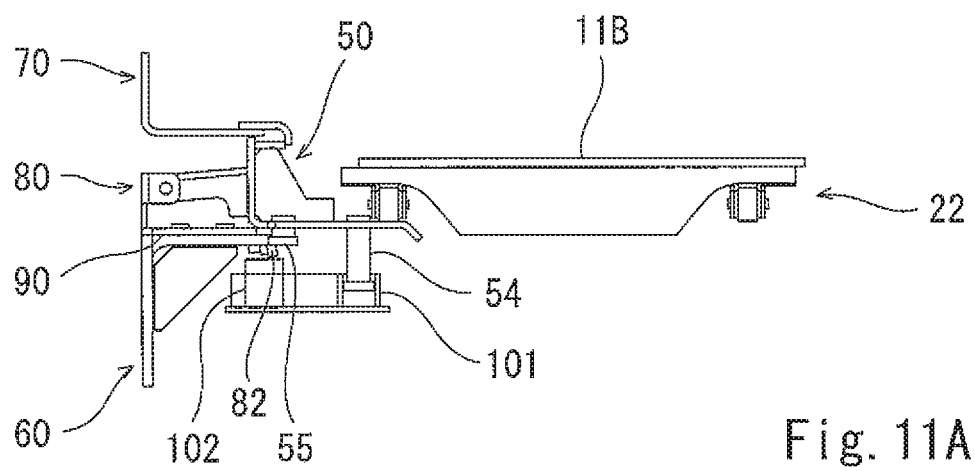
FIG. 11(A) is a view showing a second state of the same portion as that of FIG. 10(A), when viewed in the walkway length direction.
Figure 11B:
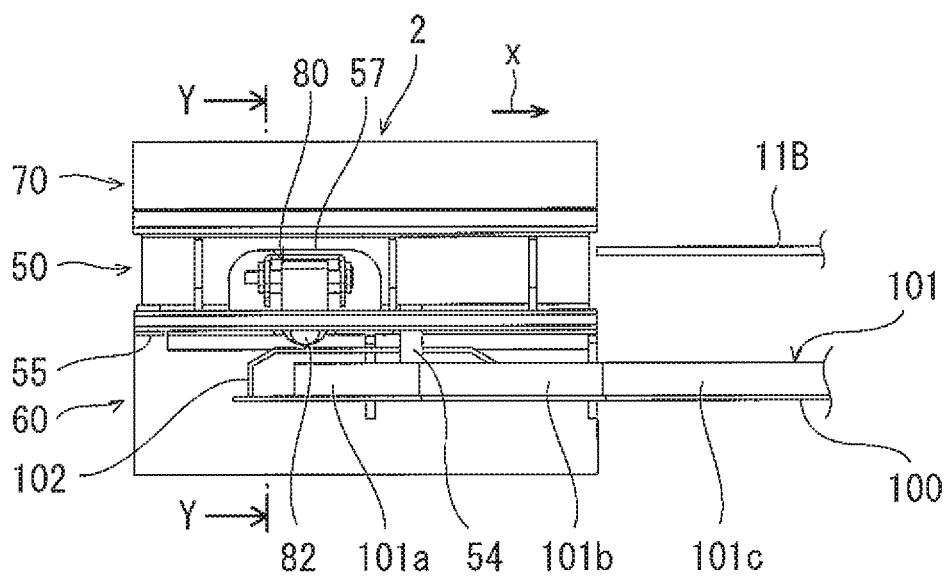
FIG. 11(B) is a view showing the same portion as that of FIG. 11(A), when viewed in the walkway width direction.
Figure 11C:
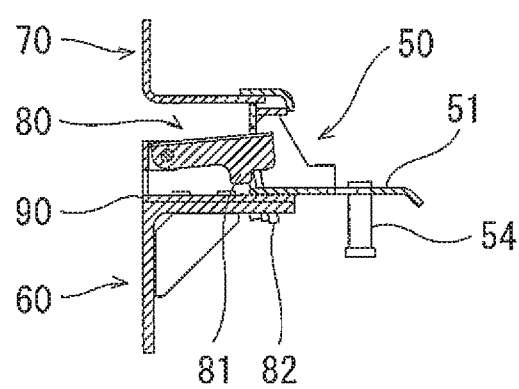
FIG. 11(C) is a cross-sectional view taken along line Y-Y of FIG. 11(B).
Figure 12A:
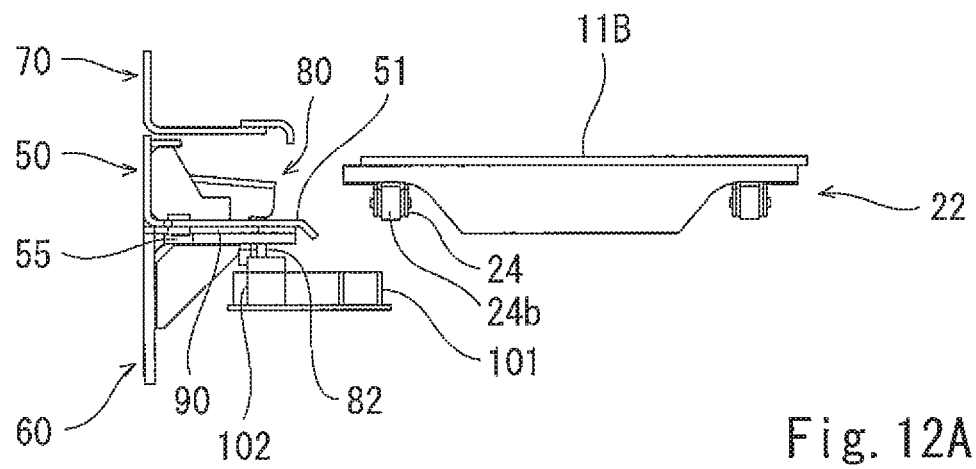
FIG. 12(A) is a view showing a third state of the same portion as that of FIG. 10(A), when viewed in the walkway length direction.
Figure 12B:
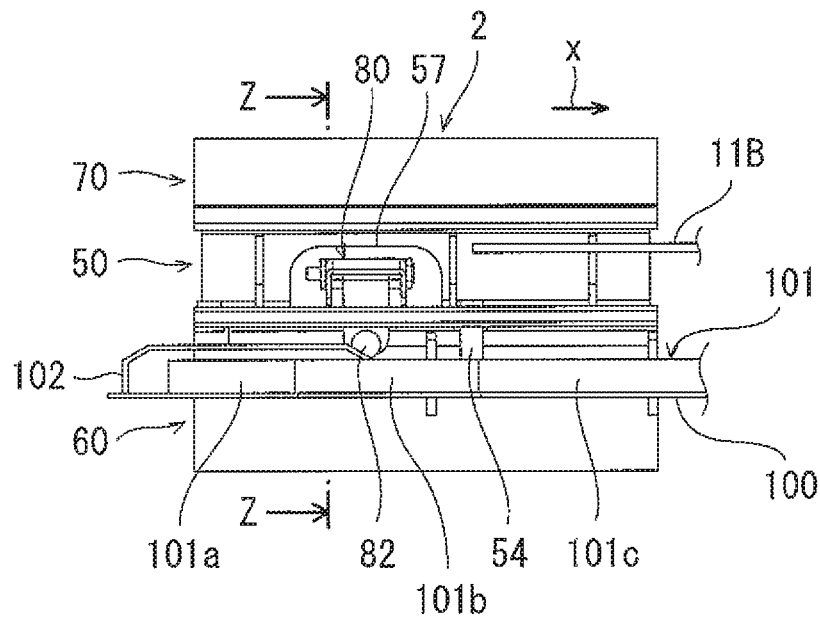
FIG. 12(B) is a view showing the same portion as that of FIG. 12(A), when viewed in the walkway width direction.
Figure 12C:
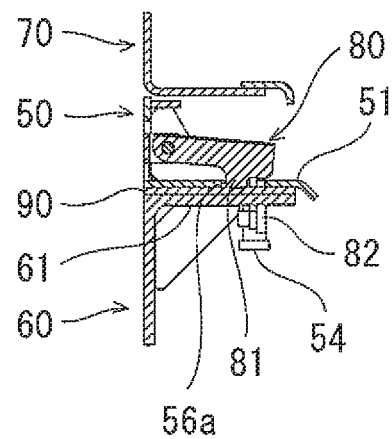
FIG. 12(C) is a cross-sectional view taken along line Z-Z of FIG. 12(B).

FIG. 10(A) is a view showing a first state of a support section 50 which is near the fixed walkway section 11B, and a region which is in the vicinity of the support section 50, when viewed in the walkway length direction. FIG. 10(B) is a view showing the same portion as that of FIG. 10(A), when viewed in the walkway width direction. FIG. 10(C) is a cross-sectional view taken along line X-X of FIG. 10(B). FIG. 11(A) is a view showing a second state of the same portion as that of FIG. 10(A), when viewed in the walkway length direction. FIG. 11(B) is a view showing the same portion as that of FIG. 11(A), when viewed in the walkway width direction. FIG. 11(C) is a cross-sectional view taken along line Y-Y of FIG. 11(B). FIG. 12(A) is a view showing a third state of the same portion as that of FIG. 10(A), when viewed in the walkway length direction. FIG. 12(B) is a view showing the same portion as that of FIG. 12(A), when viewed in the walkway width direction. FIG. 12(C) is a cross-sectional view taken along line Z-Z of FIG. 12(B). FIG. 10(B), FIG. 11(B), and FIG. 12(B) do not show the movable walkway section 22. FIG. 10(C), FIG. 11(C) and FIG. 12(C) do not show a metal plate 100 formed with the guide groove 101 and the unlocking part 102.

FIGS. 6 to 12 show that the length in the walkway width direction of the fixed walkway section 11B and the length in the walkway width direction of the movable walkway section 22 are decreased relative to those in the walkway length direction (walking direction) (the same as those in the examples of FIG. 5(C) to 5(F)).

A plurality of support sections 50 are provided along the front-rear direction, at both side surfaces in the width direction, inside the second tunnel 2. Each of the support sections 50 is configured to support the upper chain 24 between the first sprocket 25 and the third sprocket 27 so that the walkway surface of the movable walkway section 22 is maintained at a predetermined height position. Each of the support sections 50 is movable in the width direction (walkway width direction) of the movable walkway section 22. Although one support section 50 is provided at each of the both sides to correspond to the three floor members 23, this is exemplary.

For example, as shown in FIG. 7(B), inside the second tunnel 2, a lower support member 60 with a substantially-L-shaped cross-section and an upper support member 70 with a substantially-L-shaped cross-section are fastened to the panel 6 on each of both sides in the walkway width direction, to support the support section 50. The lower support member 60 and the upper support member 70 are provided continuously in the range R2 between the front end of the fixed walkway section 11B of the first tunnel 1 and the rear end of the fixed walkway section 21A of the second tunnel 2, for example, in a state in which the tunnel section TN is most extended to its maximum length as shown in FIG. 1(B), namely, a maximum range R2 in which the movable walkway section 22 can become the walkway surface. Therefore, in FIGS. 6 and 7(A), the lower support member 60 and the locking mechanism 80 (the detail will be described later) secured to the lower support member 60 are not shown, and only a portion of the upper support member 70 is shown. In the case of the third tunnel 3, the support members 60, 70 are provided continuously, for example, in a range R3 of FIG. 1(B). Note that each of the support members 60, 70 may have an integrated structure or may be comprised of a plurality of separate elements, in the range R2, R3.

As shown in FIGS. 7(A), 7(B), 10(A) or the like, the support section 50 includes a member with an L-shaped cross-section, comprised of a chain placement part 51 on which the rollers 24b of the chain 24 can be placed, and a side plate 52, and a contact member 53 provided at the upper end portion of the side plate 52 and configured to contact a stopper member 71 of the upper support member 70. The chain placement part 51 is provided with a first protruding portion 54 protruding downward to a greater degree, and a second protruding portion 55 protruding downward to a smaller degree. A hole 56 (FIG. 7(A)) is provided at a predetermined location of the chain placement part 51. A hole 57 (FIG. 7(C)) is provided at a predetermined location of the side plate 52. These holes 56, 57 are continuously formed to avoid the locking mechanism 80 which will be described later.

The lower support member 60 is constituted by a member with an L-shaped cross-section, including a flat plate 61 and a side plate 62 secured to the panel 6. For example, as shown in FIG. 10(A), a plate-shaped slide part 90 on which the support section 50 can be placed is secured onto the flat plate 61. The lower surface of the chain placement part 51 of the support section 50 is in contact with the upper surface of the slide part 90. The support section 50 is slidable in the walkway width direction on the slide part 90. A support leg 83 of the locking mechanism 80 is provided to extend vertically upward, at a predetermined location of the slide part 90.

As shown in FIGS. 9(A) and 9(B), the locking mechanism 80 includes two stopper parts 81 and an unlocking protrusion 82 disposed between the two stopper parts 81. The two stopper parts 81 and the unlocking protrusion 82 are secured to each other. The two stopper parts 81 and the unlocking protrusion 82 are rotatably mounted on a rotary shaft 84. In this structure, the two stopper parts 81 and the unlocking protrusion 82 are rotatable together around the rotary shaft 84.

As shown in FIGS. 7(B), 7(C), and 8, the guide groove 101 and the unlocking part 102 protruding upward are formed on the metal plate 100. The guide grooves 101 and the unlocking parts 102 are disposed symmetrically on both sides (the guide groove 101 and the unlocking part 102 disposed on only one side are shown in the drawings) of the fixed walkway section 11B of the first tunnel 1. The guide groove 101 includes two straight-ahead guide parts (guide parts extending straight ahead) 101*a*, 101*c*, and an oblique guide part (guide part which is oblique with respect to the two straight-ahead guide parts 101*a*, 101*c*) 101*b* between the two straight-ahead guide parts 101*a*, 101*c*. The metal plate 100 is supported by a member (not shown) protruding to the front from the front end of the tubular member 1*a* of the first tunnel 1. In brief, the guide groove 101 and the unlocking part 102 are secured to the first tunnel 1.

In a case where the tunnel section TN is extended and retracted in the front-rear direction, the second tunnel 2 is moved in the front-rear direction, with respect to the fixed walkway section 11B, the guide grooves 101 and the unlocking parts 102, and the third sprockets 27, which are mounted on the first tunnel 1. Note that the third sprockets 27 are located below the fixed walkway section 11B (see FIG. 1).

For example, as shown in FIGS. 8 and 7(A), in a case where the second tunnel 2 is moved in the front-rear direction a, the support section 50 is moved between a walkway support position at which the support section 50 supports the chain 24 of the movable walkway section 22 and a retracted position which is outward of the walkway support position in the walkway width direction. In FIGS. 8, and 7(A) to 7(C), the support section 50 indicated by a reference symbol 50*a* is located at the retracted position, while the support sections 50 indicated by reference symbols 50*b*, 50*c* are located at the walkway support position.

For example, in a case where the tunnel section TN is retracted, the second tunnel 2 is moved in an arrow x direction, with respect to the first tunnel 1. At this time, the chains 24 are guided by the third sprockets 27 and the floor members 23 are moved in turn to the underside of the fixed walkway section 11B so that the length in the front-rear direction of the walkway surface of the movable walkway section 22 is reduced. At this time, the plurality of support sections 50 are moved from the walkway support position to the retracted position, in turn, starting from one which is closer to the fixed walkway section 11B, and cease to support portions of the chains 24 which are fastened to the floor members 23 being moved to a lower side.

In contrast, in a case where the tunnel section N is extended, the second tunnel 2 is moved in a direction opposite to the arrow x direction, with respect to the first tunnel 1. At this time, the chains 24 are guided by the third sprockets 27 and the floor members 23 are moved to an upper side in turn from the underside of the fixed walkway section 11B so that the length in the front-rear direction of the walkway surface of the movable walkway section 22 is increased. At this time, the plurality of support sections 50 are moved in turn from the retracted position to the walkway support position to support portions of the chains 24 which are fastened to the floor members 23 being moved to an upper side (raised).

How the support section 50 is moved will be described.

In a case where the support section 50 is at the walkway support position, for example, as shown in FIG. 10(C), the contact member 53 is in contact with the stopper member 71 of the upper support member 70 and the outer end portion of the chain placement part 51 is pressed by the two stopper parts 81 of the locking mechanism 80.

Regarding the support section 50 (50*b*) which is at the walkway support position and is located close to and in front of the fixed walkway section 11B, as shown in FIGS. 10(A) to 10(C), the first protruding portion 54 has entered the straight-ahead guide part 101*a* of the guide groove 101. However, the unlocking protrusion 82 is not located over the unlocking part 102.

In this state, when the tunnel section TN is retracted and the second tunnel 2 is moved in the x direction, a state shown in FIGS. 11(A) to 11(C) is formed. In this state, the unlocking protrusion 82 is located over the unlocking part 102. In this way, the chain placement part 51 is released from the two stopper parts 81 of the locking mechanism 80.

When the tunnel section N is further retracted and the second tunnel 2 is moved in the x direction, the first protruding portion 54 moves (passes) through the oblique guide part 101*b* of the guide groove 101. At a time point when the first protruding portion 54 has finished moving (passing) through the oblique guide part 101*b*, the unlocking protrusion 82 moves down off the unlocking part 102, and a state shown in FIGS. 12(A) to 12(C) is formed.

The first protruding portion 54 moves (passes) through the oblique guide part 101*b* of the guide groove 101, and thus the entire support section 50 is moved outward in the walkway width direction. At this time, as shown in FIG. 8, a gap 63 through which the second protruding portion 55 moves outward in the walkway width direction is formed between adjacent lower support members 60, and a similar gap is formed between adjacent slide parts 90. The flat plate 61 of the lower support member 60 is provided with a depressed (recessed) portion 64 used to avoid the first protruding portion 54 and a depressed portion 65 used to avoid the unlocking protrusion 82. Similar depressed portions are provided in the slide part 90 on the flat plate 61. Alternatively, the side plates 62 of the plurality of lower support members 60 may be provided continuously, and the gaps 63 may be formed as grooves.

In the state of FIGS. 12(A) to 12(C), in which the support section 50 is at the retracted position, the two stopper parts 81 of the locking mechanism 80 press two edges 56*a* (see FIG. 7(A) in addition to FIGS. 12(A) to 12(C)) of the hole 56 formed in the chain placement part 51 to prevent the movement of the support section 50.

In a case where the tunnel section TN is extended, a procedure which is the reverse of the above occurs. The second tunnel 2 is moved in a direction opposite to the x-direction, the first protruding portion 54 of the support section 50 at the retracted position moves (passes) through the straight-ahead guide part 101c of the guide groove 101, and the unlocking protrusion 82 moves and is located over the unlocking part 102. Then, the first protruding portion 54 moves (passes) through the oblique guide part 101b of the guide groove 101, and the unlocking protrusion 82 moves down off the unlocking part 102. Thus, the support sections 50 at the retracted position are moved in turn inward in the walkway width direction, and are placed at the walkway support position. The support sections 50 support the chains 24 of the movable walkway section 22 being moved up (raised) from the underside of the fixed walkway section 11B.

In the present embodiment, the movable walkway section 22 includes the plurality of floor members 23 coupled to each other by the endless chains 24, and the chains 24 are supported (engaged) by the first to third rotatable sprockets 25 to 27 so that the chains 24 are rotatable. For example, in a case where maintenance for the movable walkway section 22 is carried out, an operator moves the floor members 23 exposed at the upper side of the movable walkway section 22 (the floor members 23 exposed when viewed from above) in the walking direction (front-rear direction a) by using, for example, a tool engageable with the floor members 23 so that the movable walkway section 22 can be rotated. Therefore, the floor members 23 lying at the underside of the walkway surface can be exposed as the walkway surface. As a result, the operator can easily carry out the maintenance for the floor members 23, such as replacement or repair of the floor members 23. In this case, the operator can carry out the maintenance without a need to extend the tunnel section TN to its maximum length as shown in FIG. 1(B). The above-described recitations can also apply to the movable walkway section 32 of the third tunnel 3.

To move in the walking direction, the floor members 23 exposed at the upper side of the movable walkway section 22, for example, a handle manually operated to rotate in the forward and reverse directions the coupling shaft 25a to 27a corresponding to any one of the first to third sprockets 25 to 27, or a manual rotation means such as a mounting unit used to mount this handle, may be provided. In this case, the above-described maintenance can be easily carried out. In addition, for example, in a case where the walkway surface of the movable walkway section 22 is contaminated, the operator manipulates (e.g., rotates) the handle to rotate the movable walkway section 22 so that a portion which was not the walkway surface can be exposed as the walkway surface. In this way, the portion which becomes the walkway surface can be changed and the walkway surface which is clean can be used. The above-described recitations can also apply to the movable walkway section 32 of the third tunnel 3.

Although in the present embodiment, in the movable walkway section 22, the floor members 23 are mounted over the entire periphery of the endless chains 24, the floor members 23 may be mounted on only the upper chains 24 between the first sprockets 25 and the third sprockets 27, in a state in which the tunnel section TN is extended to its maximum length as shown in FIG. 1(B). In this case, a portion of the lower chains 24 between the first sprockets 25 and the second sprockets 26 may be string-shaped members such as wires. In this case, without a need to extend the tunnel section TN to its maximum length as shown in FIG. 1(B), the movable walkway section 22 can be rotated so that the floor members 23 lying under the walkway surface can be exposed as the walkway surface. As a result, the operator can easily carry out the maintenance for the floor members 23, such as replacement or repair of the floor members 23. The above-described recitations can also apply to the movable walkway section 32 of the third tunnel 3.

Further, in the present embodiment, a driving unit for allowing the movable walkway section 22 to be rotated in the forward and reverse directions may be provided. In this case, a driving unit for rotating any one pair of sprockets of the first to third sprockets 25 to 27, of the movable walkway section 22, may be provided. For example, a driving unit such as a motor may be configured to rotate in the forward and reverse directions at least any one of the coupling shafts 25a to 27a (FIG. 3) of the first to third sprockets 25 to 27. Further, a pair of sprockets which are other than the first to third sprockets 25 to 27 and are engageable with the pair of chains 24, may be provided, and the corresponding coupling shaft may be rotated in the forward and reverse directions. The same applies to the movable walkway section 32 of the third tunnel 3. This allows the movable walkway sections 22, 32 to be rotatable, according to the walking direction in each of a case where the passengers get into the aircraft and a case where the passengers get off the aircraft. Therefore, a walking distance of the passengers can be reduced. An operation unit for allowing the movable walkway sections 22, 32 to be rotated may be incorporated into the operation board provided inside the cab or may be provided inside each of the tunnels 2, 3.

In a case where the operation unit is provided inside each of the tunnels 2, 3, the maintenance or the like for the movable walkway sections 22, 32 can be easily carried out. Also, in a case where the movable walkway sections 22, 32 are configured not to be rotated while the passengers are walking on the movable walkway sections 22, 32, the portion as the walk surface can be easily changed. This is convenient.

In the first tunnel 1, the fixed walkway section 11A may be configured as the walkway section which can be rotated in the forward and reverse directions, as in the movable walkway sections 22, 32 each including the driving unit. For example, this walkway section may include the plurality of floor members 23 coupled to each other by the endless chains 24, the first and second sprockets supporting the chains 24 so that the chains 24 can be rotated, and the driving unit which rotates any of the sprockets in the forward and reverse directions. In this case, the first and second sprockets are disposed at the front and rear end portions of the tubular member 1a of the first tunnel 1 and support the chains 24 at an equal height (vertical level). Thus, in a case where the walkway section of the first tunnel 1 is configured as the walkway section which can be rotated and the movable walkway sections 22, 32 of the second and third tunnels 3 are configured as the walkway sections which can be rotated, a walking distance of the passengers can be further reduced.

Although in the above-described example, each of the floor members 23 is coupled to the chains 24, the floor members 23 may be supported by the chains 24 in such a way that adjacent floor members 23 are coupled to each other by another coupling member, and the floor members 23 are coupled to the chains 24 while skipping one floor member 23 or two consecutive floor members 23.

In the above-described example of the present embodiment, the tunnel section TN includes the first to third tunnels 1 to 3, and the first tunnel 1 is the inner tunnel and the second tunnel 2 is the outer tunnel, in the case of, for example, the first and second tunnels 1, 2 which are adjacent to each other. In this case, the fixed walkway section 11A corresponds to the first walkway section, and the movable walkway section 22 corresponds to the second walkway section. Also, the second tunnel 2 is the inner tunnel and the third tunnel 3 is the outer tunnel, in the case of, for example, the second and third tunnels 2, 3 which are adjacent to each other. In this case, the fixed walkway section 21A and the movable walkway section 22 correspond to the first walkway section, and the movable walkway section 32 corresponds to the second walkway section. Although in the present embodiment, the tunnel section TN includes the three tunnels, the tunnel section TN may include two or more tunnels (a plurality of tunnels).

Although in the above-described example, the string-shaped members are constituted by the chains, and the first, second and third guide members are constituted by the sprockets, the string-shaped members may be constituted by belt members or wires, and the first, second and third guide members may be constituted by pulleys.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a passenger boarding bridge or the like, which allows maintenance to be easily carried out.

REFERENCE CHARACTERS LIST

TN tunnel section
1~3 tunnel
11A, 11B, 21A, 21B, 31 fixed walkway section
22, 32 movable walkway section
23 floor member
24 chain
25, 35 first sprocket
26, 36 second sprocket
27, 37 third sprocket
50 support section

The invention claimed is:

1. A passenger boarding bridge including a tunnel section including a plurality of tunnels which are telescopically fitted to each other and are movable relative to each other in a front-rear direction so that the tunnel section is extendable and retractable, the passenger boarding bridge comprising:
a first walkway section constituting a walkway of an inner tunnel of adjacent tunnels; and
a second walkway section constituting a walkway of an outer tunnel of the adjacent tunnels, the walkway of the outer tunnel including a plurality of floor members which are arranged in the front-rear direction and are coupled to each other,
wherein the second walkway section includes an endless string-shaped member supported so that the endless string-shaped member is rotatable along a virtual vertical plane parallel to the front-rear direction, and the plurality of floor members are supported by the endless string-shaped member,
wherein a walkway surface of the first walkway section of the inner tunnel and a walkway surface of the second walkway section of the outer tunnel are at a predetermined equal height position,
wherein in a case where the tunnel section is retracted, the endless string-shaped member of the second walkway section is guided so that the floor members are moved down to an underside of the inner tunnel, and
wherein in a case where the tunnel section is extended, the endless string-shaped member of the second walkway section is guided so that the floor members are moved up from the underside of the inner tunnel.

2. The passenger boarding bridge according to claim 1, wherein the plurality of floor members are supported over an entire periphery of the endless string-shaped member, the passenger boarding bridge comprising:
a driving unit which drives the endless string-shaped member so that the endless string-shaped member is rotated in forward and reverse directions.

3. The passenger boarding bridge according to claim 1, wherein the endless string-shaped member comprises at least one of a chain, a belt member, and a wire.

4. The passenger boarding bridge according to claim 1, comprising, to support the endless string-shaped member so that the endless string-shaped member is rotatable:
a first guide member mounted at a front location of the outer tunnel and being engageable with the endless string-shaped member;
a second guide member mounted at a rear location of the outer tunnel and below the inner tunnel, the second guide member being engageable with the endless string-shaped member; and
a third guide member mounted on a front end of the inner tunnel and protruding into the outer tunnel, the third guide member being engageable with the endless string-shaped member which is located on an upper side and is between the first guide member and the second guide member,
wherein the walkway section of the outer tunnel is constituted by the floor members supported by the endless string-shaped member which is located on the upper side and is between the first guide member and the third guide member, and
wherein in a case where the tunnel section is extended and retracted, the endless string-shaped member is guided by the third guide member so that a length in the front-rear direction of the walkway surface of the second walkway section is increased and reduced.

5. The passenger boarding bridge according to claim 4, wherein the endless string-shaped member is constituted by a chain, and each of the first, second, and third guide members is constituted by a sprocket.

6. The passenger boarding bridge according to claim 4, wherein the endless string-shaped member is constituted by a belt member or a wire, and each of the first, second, and third guide members is constituted by a pulley.

7. The passenger boarding bridge according to claim 4, wherein the endless string-shaped member includes a pair of string-shaped members disposed to be spaced apart in a width direction of the second walkway section, the first guide member includes a pair of guide members disposed to be spaced apart in the width direction of the second walkway section, the second guide member includes a pair of guide members disposed to be spaced apart in the width direction of the second walkway section, and the third guide member includes a pair of guide members disposed to be spaced apart in the width direction of the second walkway section.

8. The passenger boarding bridge according to claim 7, wherein the outer tunnel includes:

a plurality of support sections provided at the outer tunnel along the front-rear direction and configured to support from the underside, the endless string-shaped member which is located on the upper side and is between the first guide member and the third guide member so that the walkway surface of the second walkway section is maintained at the predetermined height position, the plurality of support sections being movable in the width direction of the second walkway section, and wherein in a case where the tunnel section is retracted and the floor members of the second walkway section are moved down to the underside of the inner tunnel, the support sections are moved outward in the width direction of the second walkway section away from the endless string-shaped member and cease to support the endless string-shaped member, and wherein in a case where the tunnel section is extended and the floor members of the second walkway section are moved up from the underside of the inner tunnel, the support sections are moved inward in the width direction of the second walkway section and support the endless string-shaped member.

\* \* \* \* \*